March 27, 1951   A. TROSCH ET AL   2,546,913
LATHE
Filed March 20, 1947   9 Sheets-Sheet 1
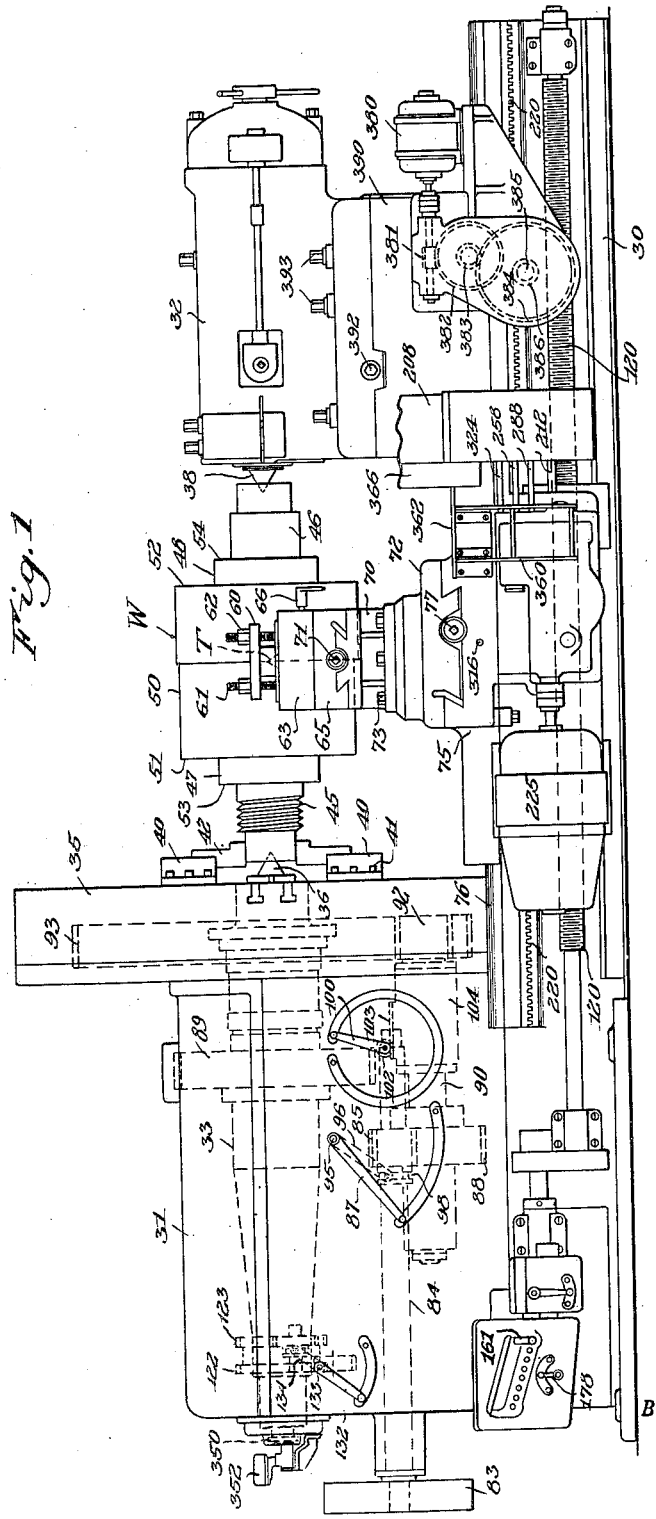
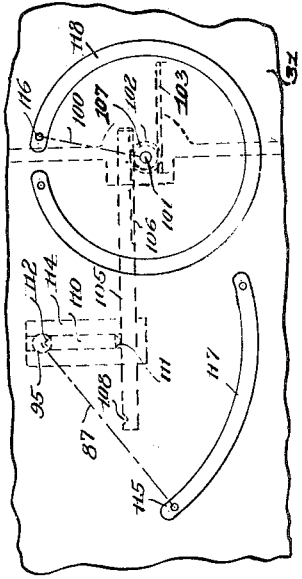
INVENTORS
Alfred Trosch
Worthy J. F. Forward
BY
B. E. Shlesinger
their Attorney

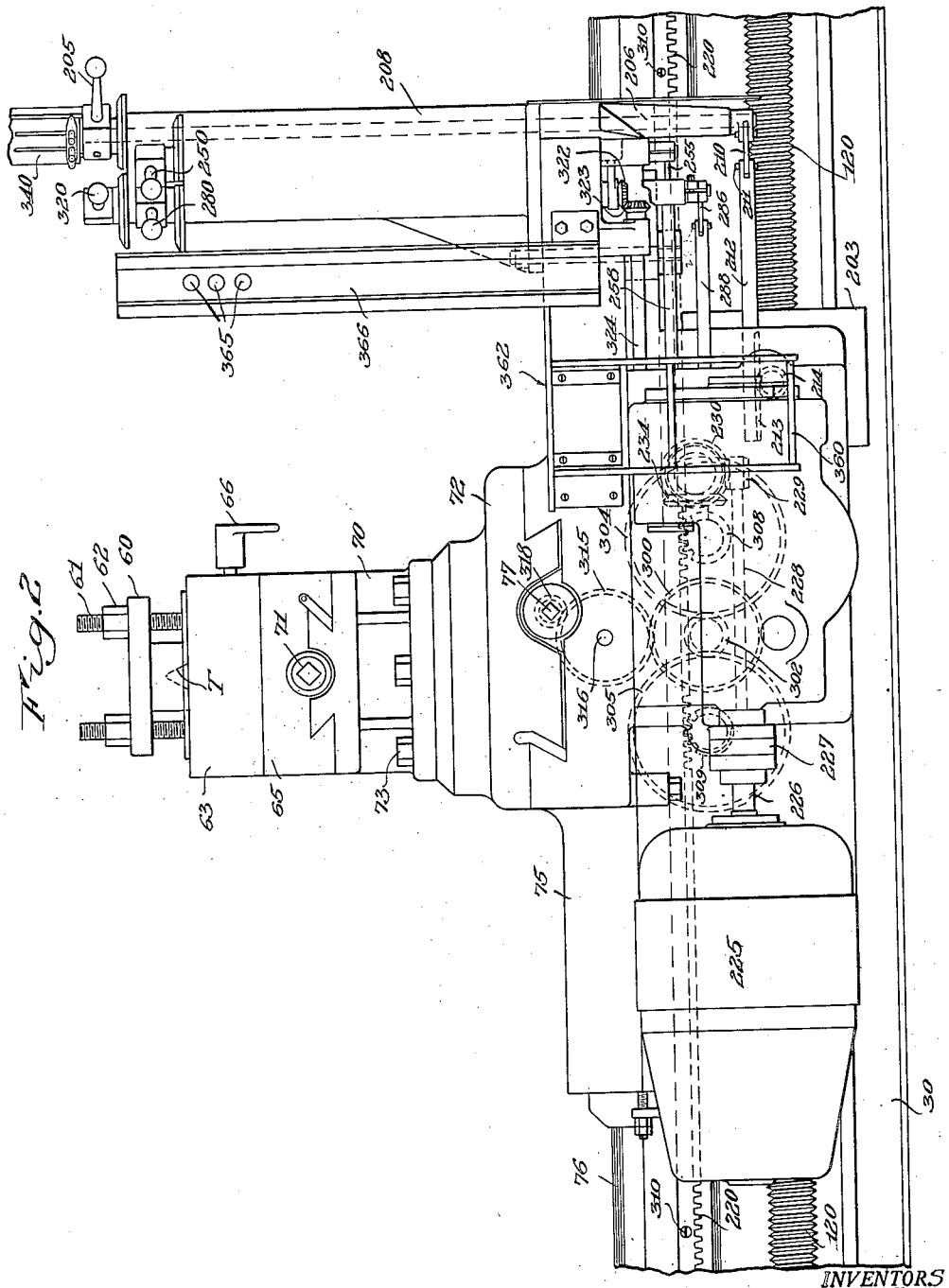

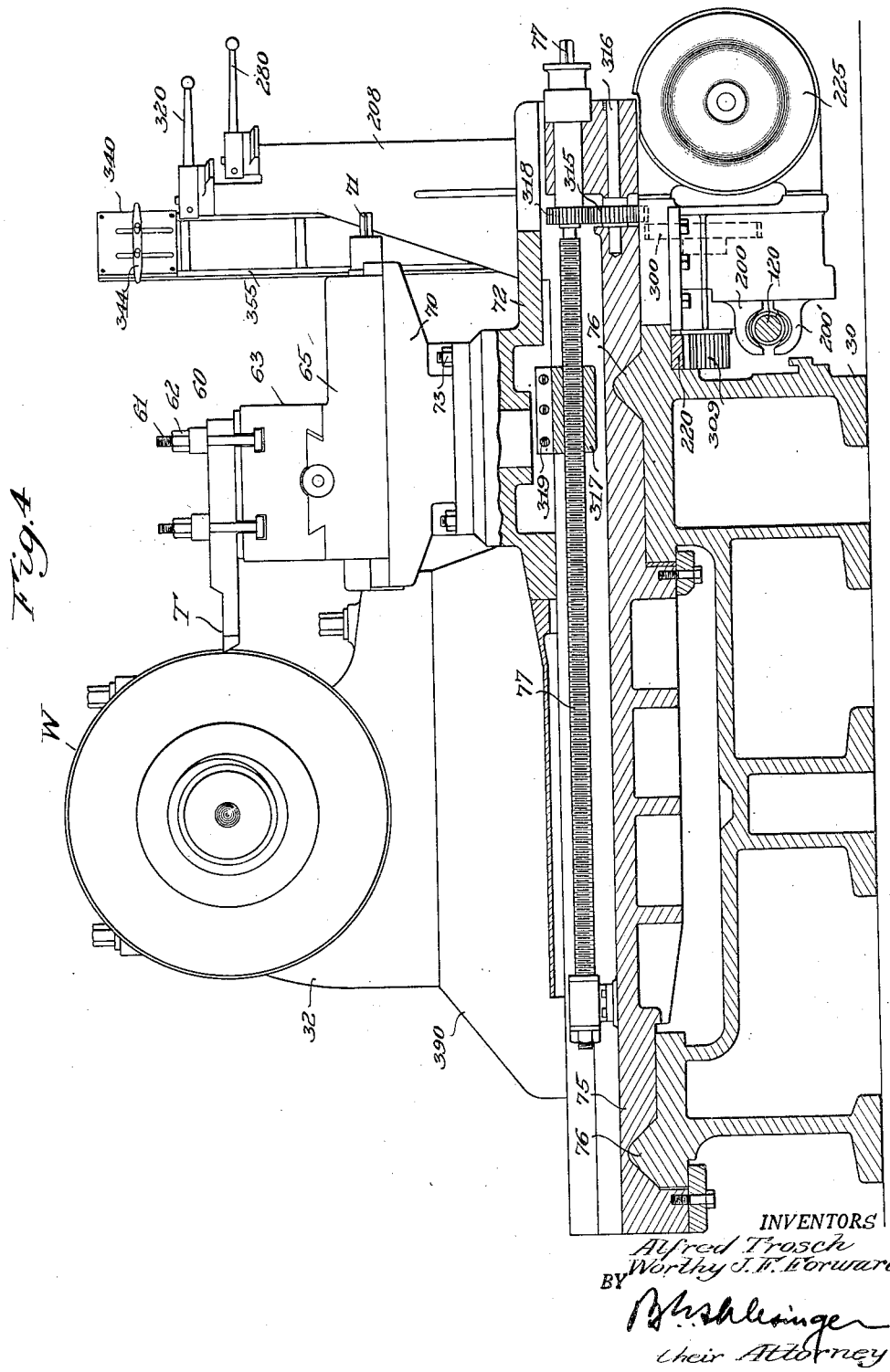

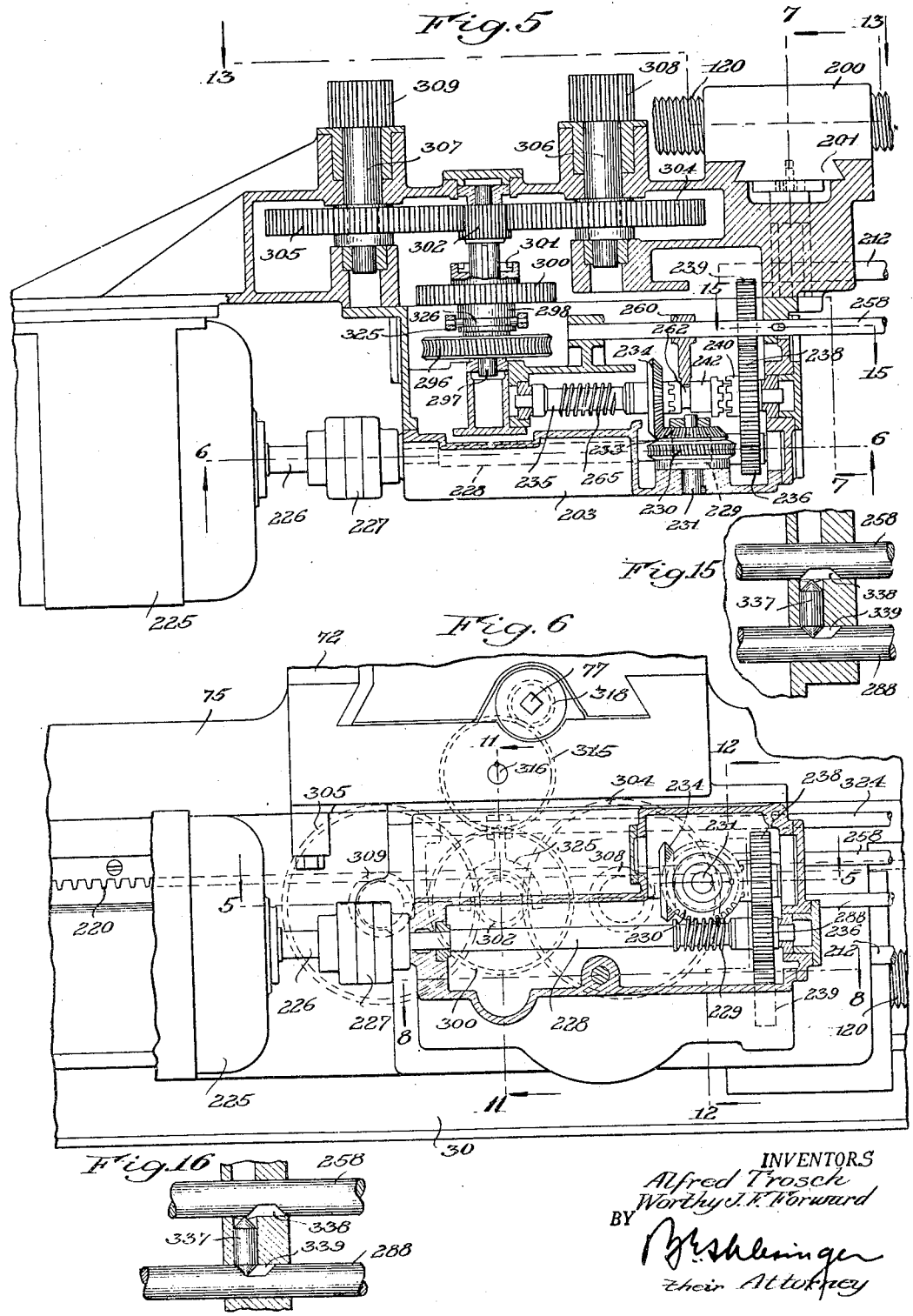

March 27, 1951

A. TROSCH ET AL 2,546,913

LATHE

Filed March 20, 1947

INVENTORS
Alfred Trosch
Worthy J. H. Forward

By B. V. Shleinger
their Attorney

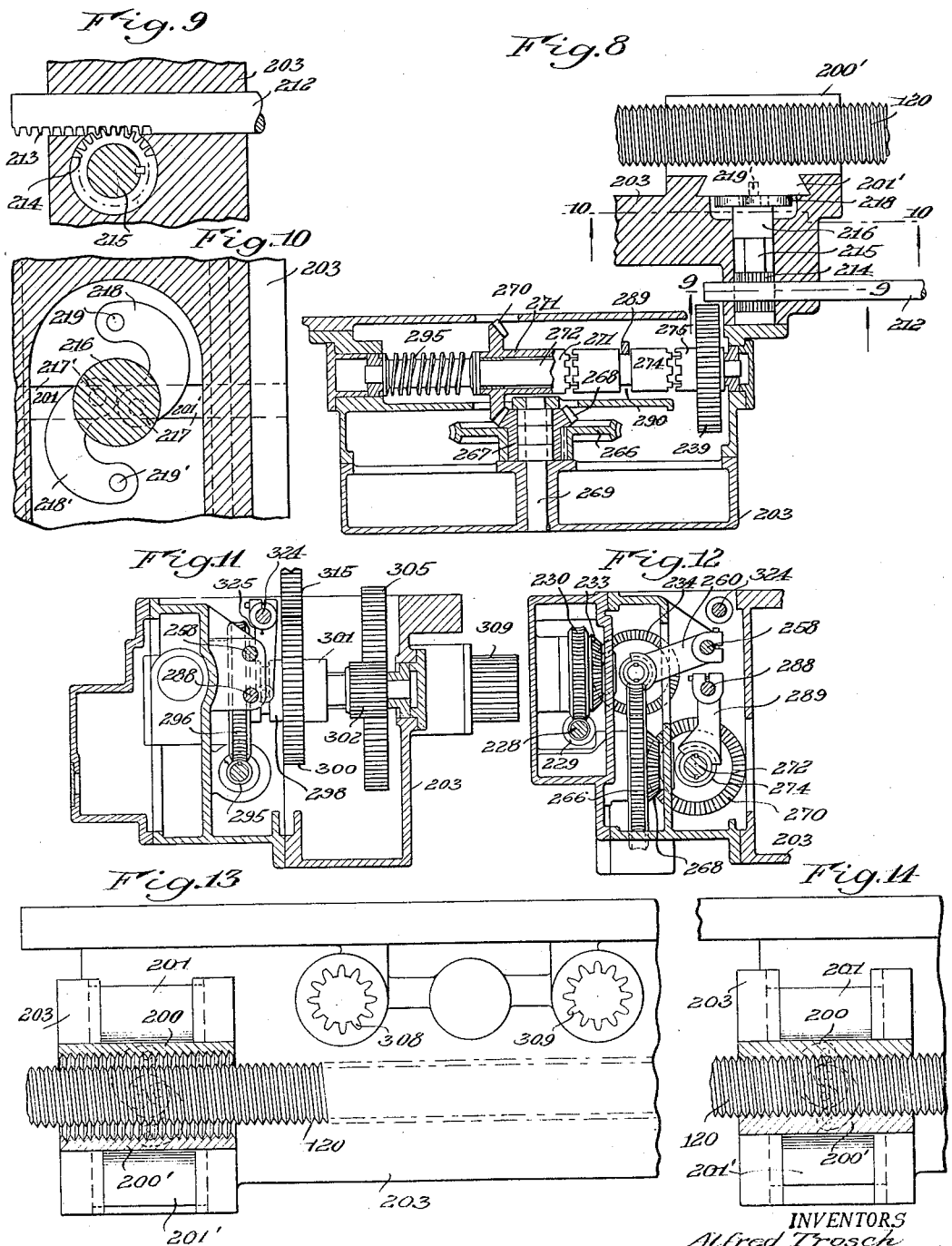

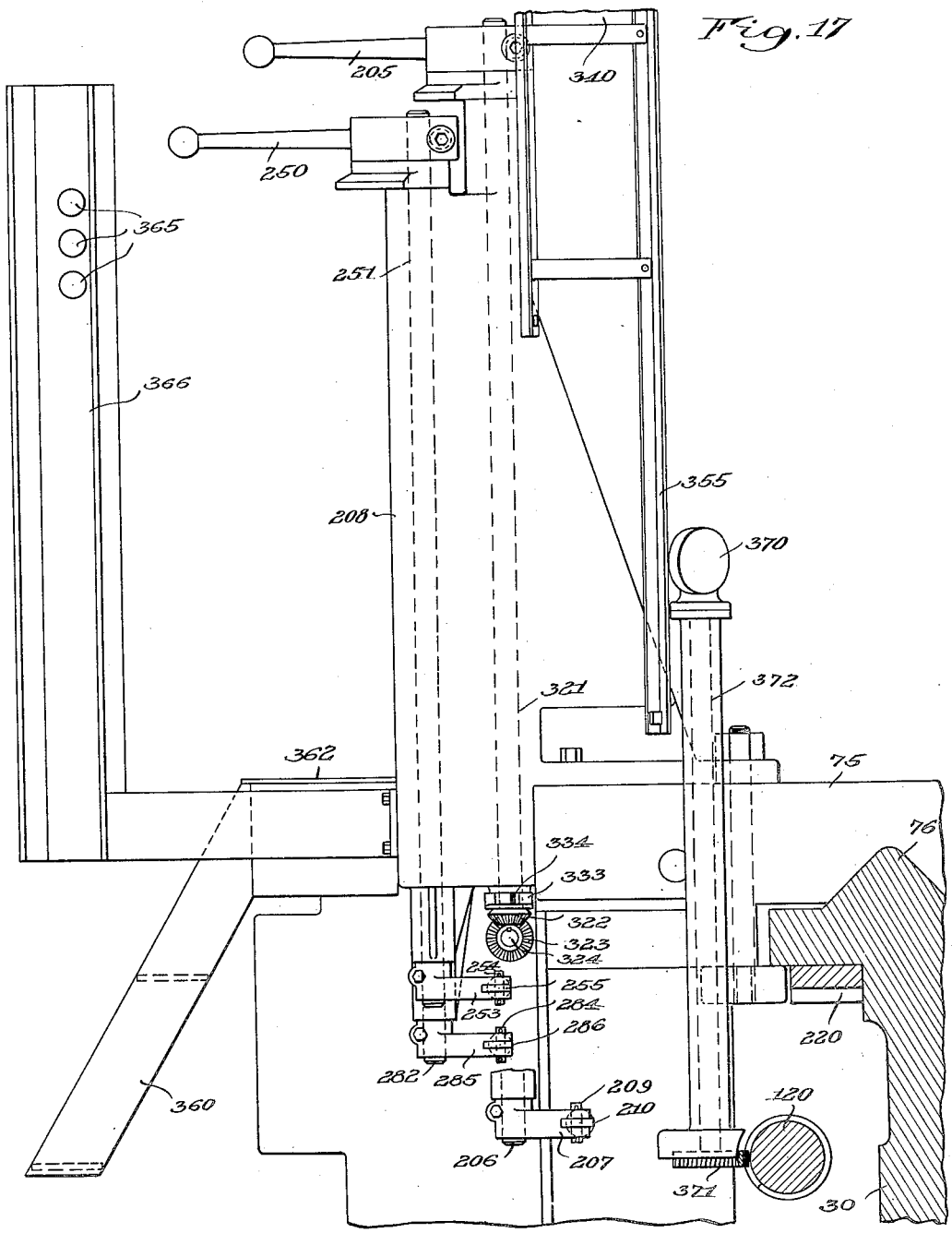

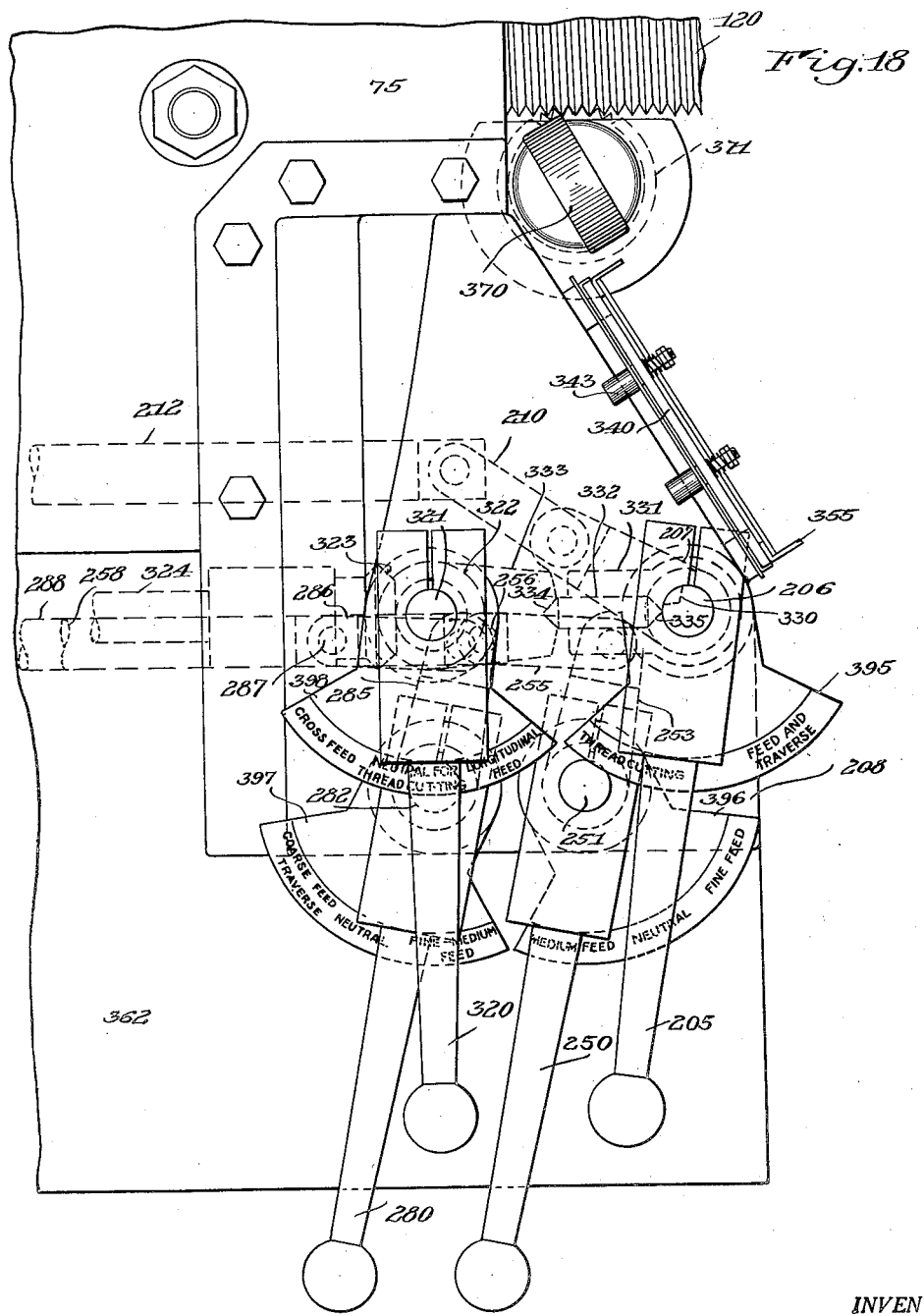

March 27, 1951 A. TROSCH ET AL 2,546,913
LATHE
Filed March 20, 1947 9 Sheets-Sheet 9

INVENTORS
Alfred Trosch
Worthy J. F. Forward
BY
their Attorney

Patented Mar. 27, 1951

2,546,913

UNITED STATES PATENT OFFICE 2,546,913

LATHE

Alfred Trosch, Brighton, and Worthy J. F. Forward, Rochester, N. Y., assignors to Consolidated Machine Tool Corporation, Rochester, N. Y., a corporation of Delaware Application March 20, 1947, Serial No. 736,058

8 Claims. (Cl. 82—2)

The present invention relates to machine tools and particularly to machine tools of large size for doing heavy work. In a more specific aspect, the invention relates to large size lathes, such as are employed in turning, facing, and threading operations on the propeller shafts of heavy marine drives, etc.

In a cutting operation on a lathe, the work is revolved on its axis while a relative feed is effected between the tool and the work. For turning and boring and for cutting screw threads, the feed is lengthwise of the work, while for a facing operation, the feed is transverse of the work.

The quality of finish of the work in a turning or facing operation, and the pitch of the thread in a thread-cutting operation, are determined by the distance which the tool moves for each revolution of the work. Accordingly, on general purpose lathes it is the practice to provide feed change gears whereby the rate of feed per revolution of the work can be varied to suit the job which is to be cut. Some metals are harder than others; diameters vary considerably on different jobs; different types of tools may be employed in cutting different types of work. For all these and other reasons it is also the practice on general purpose lathes to provide speed change gears to vary the rotation of the work relative to the tool. If the speed of rotation of the work is excessive, the tool will become dull in too short a time and the lathe cannot be operated economically.

For a thread-cutting operation, the work rotation has to be in time with the lengthwise feed so that a thread of the desired pitch may be cut, but for a turning or boring operation the timing of the feed to the work rotation is not so critical. In lathes of large size it is therefore the practice to provide a feed screw and nut for controlling the lengthwise feed of the carriage during thread-cutting, but to use a pinion, or a pair of pinions, and a rack to feed the carriage longitudinally during turning. Thus, the feed screw, which must be made most precise, is saved from unnecessary wear.

Heretofore, these large lathes have been constructed so that both the feed screw and the feed pinion are driven in time with the rotation of the work spindle. Thus, the same set of change gears are in the train for driving the feed screw as for driving the feed pinion.

In machining a large work-piece, there may be several operations to be effected on the lathe. The work may have to be turned to different diameters at different portions along its length, as to provide journal bearings, a gear body, etc.; the ends of the gear body may have to be faced; and, in addition, the shaft may have to be threaded along parts of its length. It is customary on a large size lathe to perform all of these operations in a single set-up of the machine. For the turning and facing operations faster feeds, however, can be employed than in a threading operation. Hence, the operator of the machine is expected to shift change gears between turning and threading operations so that the machine can be run during each operation at the speed best suited to that operation.

For big work, the lathe required is a huge machine, long as well as high. Steps may have to be provided on the side of the machine, for instance, so that the operator can have access to the work and the tool. In large size lathes as heretofore built, the speed and feed change gears have been placed together at one end of the machine, which means that they are quite a number of paces away from the normal position of the operator in observing the operation of the machine. It is burdensome for the operator to walk back and forth from operating position to the change gear box, changing gears to suit the different types of work to be done at different points along the length of the work-piece. The operator has to be careful, of course, to use the correct change gears for a thread-cutting operation, for if the pitch of his thread is not right, the job has to be scrapped, but for a turning or facing operation the change gears do not have to be so exact. The ratio of feed to work rotation affects the finish of the job, but within fairly wide limits the important function of the feed change gears in a turning operation is to govern the speed of that operation. Therefore, an operator is prone to let the feed change gears, which he has selected for the thread-cutting operation on the job, govern the turning or facing operations, so that he doesn't have to go back and forth to the change gear box to shift gears. This means that the turning operation is frequently performed at a slower speed than necessary, with the consequent loss of time in production. Moreover, it means that the feed screw is run unnecessarily, when the feed pinion and rack might be used, and as a result the screw is subjected to excessive wear, impairing the accuracy of the machine.

Another disadvantage of previous designs of large size lathes, even where the operator is most careful about shifting change gears to suit different phases of work to be done, is that the operator must stop the machine completely before he can effect shift of these gears. Hence, the machine has ordinarily to be stopped and started many times in the course of machining a particular piece of work. This again means loss of production time.

One object of the present invention is to provide a lathe for large size work in which the feed mechanism for turning, boring, and facing operations is wholly independent of the feed mechanism for threading, and in which separate sets of change gears are provided for the two feeds, so that the operator will be motivated to choose the proper feed for each phase of the job.

A further object of the invention is to provide a large size lathe in which the feed for threading is so separated from the feeds for turning, boring, and facing that the feed screw will only be employed during thread-cutting, and this quite expensive and accurate part of the machine may have the maximum life.

Another object of the invention is to provide a large size lathe in which the feed change gears for turning and facing operations will be readily accessible to the operator, so that he can easily shift gears to obtain the proper feed for any turning, boring, or facing operation without moving from his normal operating position.

A further object of the invention is to provide a lathe in which shift from a turning or facing operation at one feed rate to a threading operation at a different feed rate, or vice versa, can be made without having to stop the machine.

Another object of the invention is to provide a large size lathe having a separate feed for turning, boring and facing from the feed for threading, in which the feeds are so interlocked that one cannot be actuated while the other is in operation or operable.

Another object of the invention is to provide a lathe having a feed mechanism for turning, boring, and facing operations with which an almost infinite variety of such feeds may be obtained.

A further object of the invention is to provide a feed mechanism for turning and facing operations which is actuated by a variable speed motor and with which a fine, medium, or coarse feed, as desired for a particular job, can be obtained while effecting the operation at the fastest speed suitable to the job.

Still another object of the invention is to provide the operator with a combined chart and gauge from which he can quickly and accurately determine from the speed of rotation of the work spindle and the linear feed rate, what speed of motor and what set of feed change gears to use on a particular turning, boring, or facing operation.

Other objects of the invention will be apparent hereinafter from the specification and from the recital of the appended claims.

In the drawings:

Fig. 1 is a side elevation of a lathe built according to one embodiment of this invention;

Fig. 2 is a fragmentary side elevation on an enlarged scale of a part of this lathe, showing particularly the feed drive for turning, boring, and facing operations;

Fig. 3 is a fragmentary view on an enlarged scale illustrating the interlock for the speed change gears of the work spindle drive;

Fig. 4 is a transverse sectional view through the machine on an enlarged scale;

Fig. 5 is a fragmentary sectional view on an enlarged scale, showing details of the drive to the feed pinions, the section being taken on the line 5—5 of Fig. 6;

Fig. 6 is a sectional view taken at right angles to the section of Fig. 5, the section being taken on the line 6—6 of Fig. 5;

Fig. 8 is a fragmentary sectional view taken on the line 8—8 of Fig. 6;

Fig. 9 is a fragmentary sectional view on the line 9—9 of Fig. 8, showing a detail of the mechanism for operating the nut which cooperates with the lead screw;

Fig. 10 is a fragmentary sectional view on the line 10—10 of Fig. 8, showing a further detail of this nut operating mechanism and showing the nut in open position;

Fig. 11 is a section on the line 11—11 of Fig. 6;

Fig. 12 is a section on the line 12—12 of Fig. 6;

Fig. 13 is a fragmentary sectional view on the line 13—13 of Fig. 5, looking at the back of the apron of the lathe carriage, showing the split nut, which cooperates with the lead screw, in open position;

Fig. 14 is a fragmentary view, showing the split nut and the mechanism for operating the same, with the nut in closed position;

Fig. 15 is a fragmentary sectional view on the line 15—15 of Fig. 5, showing the interlock between two of the shift rods which control the clutches of the turning feed change gear box;

Fig. 16 is a fragmentary view corresponding to Fig. 15, but showing the interlock in operative position;

Fig. 17 is a fragmentary view, on a greatly enlarged scale, taken at right angles to the lathe bed and showing particularly the mounting of the operating levers which control the various clutches of the turning feed change gear box;

Fig. 18 is a plan view of the parts shown in Fig. 17, part of the mechanism being broken away to show the feed screw and the gauge which it actuates;

Figure 7:
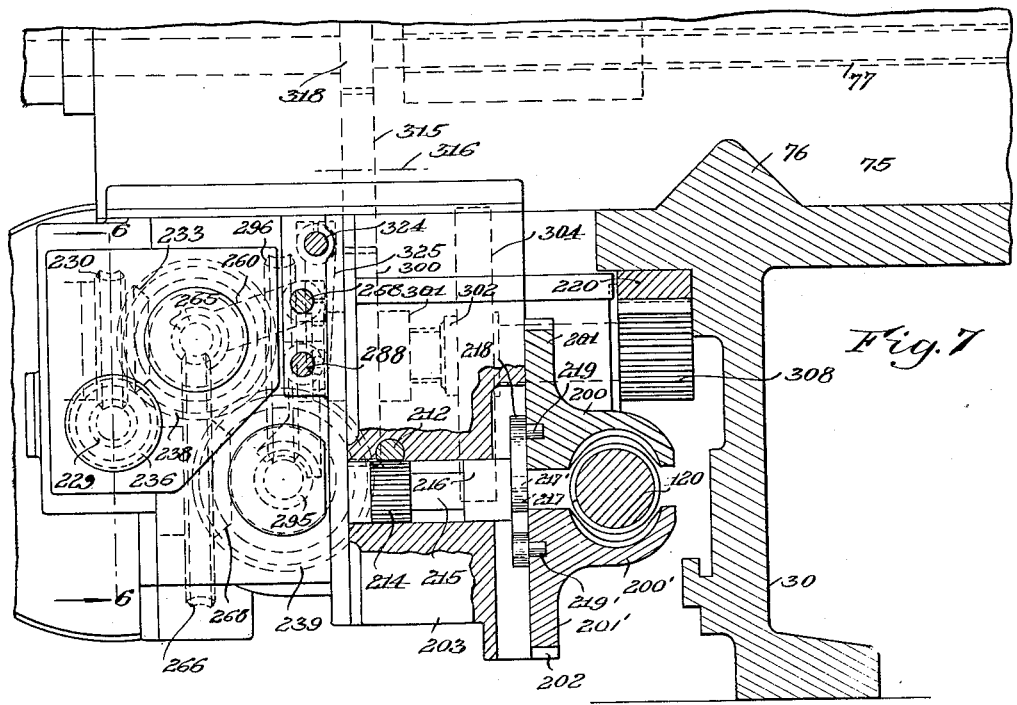
Fig. 7 is a fragmentary view, looking at the right-hand side of the parts shown in Figs. 5 and 6, parts being broken away, and the part of the lathe bed being shown in section.

The lathe illustrated in the drawings has, as have had prior lathes, a feed screw and nut for producing the longitudinal feed movement of the carriage during threading operations, and separate pinions and a rack for producing the lengthwise feed motion of the carriage during a turning or boring operation. As in previous types of lathes, also, the drive to the feed-screw is geared to the work spindle drive, and speed change gears are incorporated in the work spindle drive while feed change gears are incorporated in the train of gearing which connects the work spindle with the lead screw, so that the feed screw may be driven in proper timed relation to the rotation of the work spindle to produce a thread of the required pitch. In this machine, however, the feed pinions are driven through a train of gearing completely separate from the drives to the work spindle and feed screw, and actuated by a motor separate from the motor which drives the work spindle and feed screw. This motor is a variable speed motor, preferably of the electronically-controlled type with an extremely wide range of speeds. Change gears are provided between this motor and the feed pinions and by shifting clutches a fine, medium or coarse feed can be obtained at any motor speed. A safety interlock is provided between the two feed mechanisms so that the drive to the feed screw cannot be engaged while the drive to the feed pinions is in engagement and vice versa.

The cross-feed drive for facing operations is actuated from this same variable speed motor and through these same sets of change gears. A separate clutch is provided to permit engaging selectively either the longitudinal or the cross-feed drive.

While the levers for shifting the speed change gears and the feed change gears of the feed screw drive are left, as in previous designs of heavy lathes, at the headstock end of the machine where both can be manipulated from the same position, the levers for shifting the clutches, that control the feed change gears of the feed pinion drive, the lever that controls the interlock between the feed screw and the feed pinion drives, the controls for the variable speed motor of the feed pinion drive, and the combined chart and gauge by which the operator may determine what speed of the variable speed motor and what set of change gears to use for a particular job, are all located at a central point longitudinally of the machine where the operator can easily manipulate or observe them, as the case may be, from one position.

Since normally the same pitch of thread is used, even though threads are to be cut at different points along a shaft or other workpiece, with the machine illustrated, the operator can set the feed change gears required for thread-cutting before he starts the machine, and thereafter he does not have to move from his central observing position during the whole operation of machining a particular job. When it becomes necessary to turn or face, he simply shifts the proper lever at his central operating position. Moreover, since separate sets of change gears are included in the feed screw and rack drives, respectively, and since these drives are interlocked, the operator does not have to stop the machine to shift from a thread-cutting to a turning or facing operation, and vice versa. Hence the complete machining on a particular piece of work can be effected in the shortest possible time.

Referring now to the drawings by numerals of reference, 30 denotes the bed of the machine, 31 designates the headstock and 32 the tailstock. Journalled in the headstock 31 is the work spindle 33. Secured to this spindle, in any suitable manner is the face-plate 35, and mounted coaxially of this spindle to project forwardly of the face-plate is the center 36.

The tailstock 32, which may be of any standard or suitable construction, carries the center 38, which is in axial alignment with the center 36 of the headstock. The work W is adapted to be supported between these two centers. In the instance shown, the face-plate 35 has secured to it by means of screws 41 a plurality of chucking members 40. These members carry clamping jaws 42 which engage the work so that it will rotate with the face-plate and work spindle between the centers 36 and 38.

In the drawings, the work, which is to be machined, is a shaft having portions 45 and 46 that are to be threaded, portions 47 and 48 that are to be turned to one diameter, for instance, for bearing purposes, and a portion 50, which is to be turned to a greater diameter, for instance, to form the body portion of a gear. In addition, the surfaces 51 and 52 of the portion 50 require to be faced and the surfaces 53 and 54 of the bearing portions 47 and 48, respectively, may also need to be faced.

The tools T (Figs. 1 and 4), which are to be used for the various operations, are adapted to be clamped in the usual manner to the tool post 63 as by means of bars 60, screws 61 and nuts 62. The tool post may be of standard construction and may be mounted, in conventional fashion for rectilinear adjustment on the compound slide or rest 65, the adjustment being effected in the usual manner by a screw operated by the handle 66. The compound slide is mounted for rectilinear adjustment on a table 70 for adjustment in a direction at right angles to the direction of adjustment of the tool slide 63, the adjustments being effected in the usual manner by means of a screw, such as screw 71. The table is mounted in the usual manner on a cross-slide 72 for angular adjustment thereon. This adjustment may be effected in any suitable fashion, and after it has been completed, the table 70 may be secured to the cross-slide 72 by bolts 73. The cross-slide 72 is mounted, as usual, for rectilinear movement on the carriage 75 of the lathe in a direction at right angles to the direction of movement of the carriage. The carriage 75 is adapted to slide on parallel longitudinal ways 76 formed on the bed 30 of the machine.

For a facing operation, the cross-slide 72 is actuated by screw 77 in a manner which will be described hereinafter in more detail. During a turning or a threading operation, the tool T is moved axially of the work by movement of the carriage 75. In each case, of course, the work rotates on its axis through rotation of the work spindle 33.

Figure 21:
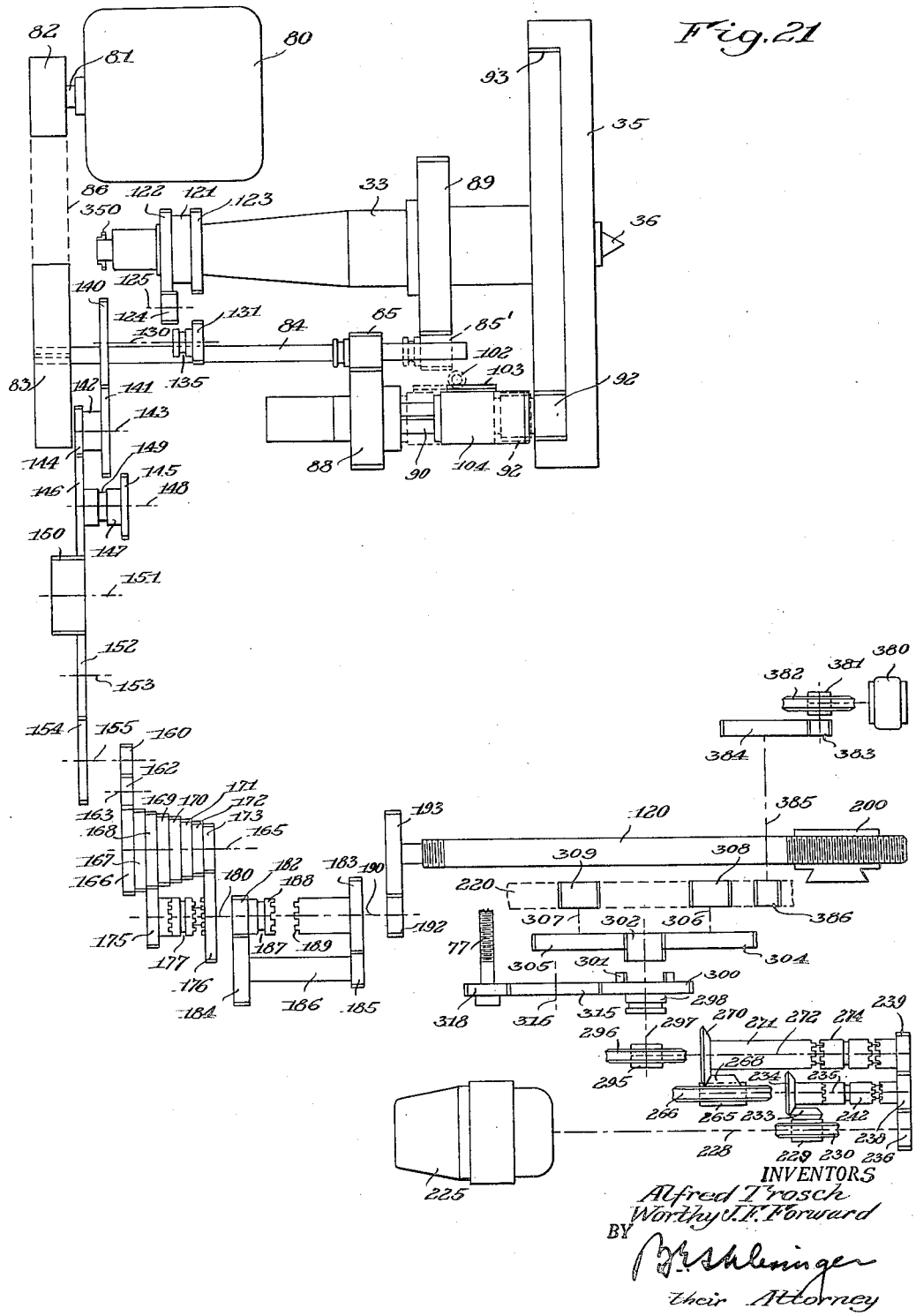
Fig. 21 is a drive diagram of the machine.

The work spindle is adapted to be driven from a motor 80 (Fig. 21) which may be mounted at any suitable point on the bed 30 or headstock 31. The armature shaft 81 of the motor has a pulley 82 secured to it that drives a pulley 83 through a belt 86. The pulley 83 is keyed to a shaft 84 (Figs. 1 and 21). This shaft is journalled in any suitable manner in the headstock 31. It is splined at its inner end and has slidably mounted thereon a spur pinion 85. The pinion 85 is adapted to be moved axially on the shaft 84 by means of a shift lever 87 to engage the pinion either with a spur gear 88 or a spur gear 89. The pinion is shown in full lines in Fig. 21 in engagement with gear 88, and in dotted lines at 85' in the position it occupies when in engagement with gear 89.

The gear 88 is keyed or otherwise suitably secured to a shaft 90 which is suitably journalled in the headstock 31. The shaft 90 has a pinion 92 slidably keyed to it. This pinion is adapted to mesh with an internal gear 93 which is secured to or formed integral with the face-plate 35. The gear 89 is keyed or otherwise fastened to the work spindle 33.

In one position, then, pinion 85 drives the face-plate 35 and work spindle 33 through the gear 88, shaft 90, pinion 92 and internal gear 93. In its other position, pinion 85 drives the work spindle 33 and face-plate 35 through the gear 89. Thus, by shifting the pinion 85, the work can be rotated at different speeds.

The shift lever 87 is connected to the pinion 85 by a shaft 95 (Figs. 1 and 3) and a lever arm 96. The shaft 95 is suitably journalled in the headstock 31. The shift lever 87 is secured to one end of this shaft while the lever arm 96 is secured to the other end thereof. The lever arm 96 carries a roller at its free end which is adapted to engage in a peripheral groove 98 formed in the hub of pinion 85.

When the pinion 85 is driving the work spindle 33 through the gear 89, it is inadvisable to have the pinion 92 in mesh with the internal gear 93. For this reason, a shift lever 100 is provided by means of which the pinion 92 may be moved axially into and out of engagement with the internal gear 93. This shift lever 100 is secured to a shaft 101 that has a spur pinion 102 formed integral with it. This pinion meshes with a rack 103 that is fastened to one side of a sleeve 104 which is integral with pinion 92 and which is adapted to slide axially on shaft 90. The shaft 90 is splined so that, as already indicated, pinion 92 will not rotate relative thereto. Pinion 92 is shown in full lines in Fig. 21 in engagement with internal gear 93, and in dotted lines in the position it occupies, when withdrawn axially from mesh with the internal gear.

To prevent the pinion 85 from being shifted into engagement with the gear 89 while the pinion 92 is in engagement with the gear 93, an interlock is provided between the two shift levers 87 and 100. This interlock (Figs. 1 and 3) comprises a rod 105, which has rack teeth 106 formed on one side adjacent one end. These teeth engage with a pinion 107 formed integral with the shaft 101. The rod 105 has a notch 108 in it adjacent its other end and at the opposite side from the rack teeth 106. Mounted between the rod 105 and the shaft 95 of shift lever 87 is a locking bar 110. This bar has its opposite ends formed to conical shape as denoted at 111 and 112, respectively. The end 111 is adapted to seat in the notch 108 of bar 105 and the end 112 is adapted to seat in a conical notch formed in the shaft 95. The bar is adapted to reciprocate in a guide member 114 that is secured to the headstock 31.

In the position shown in Fig. 2, the bar 110 locks the shaft 95 against rotation because its conical end 111 is riding on the periphery of the rod 105 and its conical end 112 is engaged in the notch in the shaft 95. This is the position of the parts when the pinion 92 is in mesh with the internal gear 93. When the pinion 92 is withdrawn from mesh with the internal gear 93, the pinion 92 and sleeve 104 are moved to the left, but the rod 105 is moved to the right and the notch 108 is brought into registry with the conical end 111 of the bar 110. Thus, the bar 110 can drop down, disengaging the end 112 of the bar from the cooperating notch in the shaft 95. Then the shaft 95 is free to be rotated to shift the pinion 85 into engagement with the gear 89. The shift levers 87 and 100 may be manipulated by grasping spring-pressed knobs that are secured to the levers. These knobs may travel in the arcuate slots 117 and 118, respectively, provided on the side of the headstock 31, and may be locked at opposite ends of their travel by engaging in the recesses 115 and 116, respectively, as is conventional practice.

For thread-cutting, as already stated, the carriage 75 is moved longitudinally of the bed 30 in time with the rotation of the work spindle 33. This movement is effected by rotation of the lead screw 120 (Figs. 1 and 21). The train of gearing, which connects the work spindle with the lead screw, will now be described. Since this gearing is conventional, it is only shown diagrammatically.

Keyed to the work spindle 33 is a sleeve 121 with which are formed integral two equal spur gears 122 and 123. The gear 122 meshes with a spur pinion 124, which is secured to a shaft 125 that is suitably journalled in the headstock 31.

Keyed to a shaft 130, that is journalled in the headstock 31 in parallelism to the shaft 125 and work spindle 33, is a spur pinion 131. This pinion is adapted to slide on the shaft 130 and is adapted to be meshed selectively with either the pinion 124 or the gear 123 to drive the shaft 130 in opposite directions, respectively, from the work spindle 33. The pinion 131 is adapted to be shifted axially by manipulation of the lever 132 which is fastened to a shaft 133 that is journalled in the headstock 31. This shaft has a lever arm 134 secured to its other end which carries a roller that engages in the peripheral groove 135 formed in the hub of pinion 131.

Keyed to the shaft 130 is a spur gear 140. This meshes with a spur gear 141 that is integral with a sleeve 142 which is suitably journalled in the headstock 31 to rotate about an axis 143. Integral with the sleeve 142 is a second spur gear 144 which is of a different tooth number from the gear 141. The gears 141 and 144 are adapted to mesh, respectively, with gears 145 and 146. These gears are formed integral with a sleeve or hub 147 which rotates about an axis 148 and which is suitably journalled in the headstock 31. This sleeve or hub has a peripheral groove 149 formed in it which is adapted to be engaged by the roller of a shift lever (not shown) so that the sleeve can be moved axially to engage the gears 145 and 146 selectively with the gears 141 and 144, respectively, to drive the shaft 148 at different speeds from the shaft 143. The gear 146 meshes with a long-faced gear 150 which rotates on an axis 151, and this gear meshes, in turn, with a gear 152 which rotates on an axis 153. The gear 152 meshes with a gear 154 which rotates on an axis 155.

Secured to the shaft 155 is a spur pinion 160. This pinion forms parts of a conventional feed change gear set, which can be shifted by the shift lever 161 (Fig. 1). The pinion 160 meshes with a spur pinion 162 which is rotatable on the axis 163 and which is mounted in conventional manner to move axially with the pinion 160.

Keyed to a shaft 165, which is parallel to the shafts 155 and 163, are a plurality of feed change gears 166 to 173 inclusive, which differ in tooth number from one another. The gears 160 and 162 are adapted to be moved axially along shaft 155 and to be swung about the axis of shaft 155 so that the pinion 162, while remaining in mesh with the pinion 160, may simultaneously be engaged selectively with any one of the feed change gears 166 to 173 inclusive. The gear 168 meshes with a spur gear 175 and the spur gear 173 meshes with a spur gear 176 which is coaxial of gear 175. Between the two spur gears 175 and 176 is a shiftable sleeve 177 which is formed with clutch teeth on its opposite ends that are adapted to engage complementary clutch teeth formed on the hubs of the gears 175 and 176. Hence, by shifting the sleeve 177 through shift lever 178, one or other of the gears 175 or 176 can be connected to the shaft 180 to drive that shaft from shaft 165.

Splined to the shaft 180 is a spur gear 182. 183 denotes a gear which is splined to a shaft 199 that is axially aligned with shaft 180. The gear 182 is slidable on shaft 180. In one position it meshes with a spur gear 184. The gear 183 meshes with a spur pinion 185. The gear 184 and pinion 185 are integral with a sleeve 186.

The gear 182 has a hub portion integral with it which is provided with a peripheral slot 197 and which has face clutch teeth 188 formed on one end thereof. These clutch teeth may be engaged with complementary face clutch teeth 189 formed on the hub of the gear 183. When the gear 182 is in the position shown in Fig. 21, the drive from shaft 180 is through gear 182, gear 184, pinion 185 and gear 183 to shaft 190. When the gear 182 is shifted axially to the right, however, to engage clutch teeth 188 and 189, then the shaft 180 is directly coupled to the shaft 190.

Secured to the shaft 190 is a spur pinion 192 which meshes with a spur gear 193 that is secured to the lead screw 120.

The lead screw 120 is adapted to engage with a split nut, the two parts of which are designated 200 and 200', respectively (Figs. 7, 8, 13 and 14). Each part of the nut is formed with a dove-tailed guide portion, denoted at 201 and 201', respectively. These dove-tailed portions are adapted to slide in a slot or guide-way 202 (Fig. 7) formed in the apron 203 of the carriage 75.

The split nut is adapted to be opened or closed, to engage or disengage the screw 120, by manipulation of an operating lever 205 (Figs. 18 and 2). This lever is secured to a shaft 206 which is suitably journalled in a column 208 that is mounted on the carriage 75 to travel with the carriage. Pivotally connected to the lower end of the shaft 206 as by means of a pin 209 (Fig. 17) is a link 210 (Figs. 2 and 17). This link is pivotally connected at its opposite end by means of pin 211 with a bar 212. The bar 212 has rack teeth 213 (Fig. 9) formed on one side thereof which engage with the teeth of a pinion 214 (Figs. 2, 8, and 9) that is secured to or integral with a shaft 215.

The shaft 215 has a disc 216 (Figs. 8, 10, and 7) integral with it. To this disc there are connected by pins 217 and 217' two arcuate link members 218 and 218'. These link members are in turn connected by pins 219 and 219', respectively, to the dove-tailed portions 201 and 201', respectively, of the split nut members 200 and 200', respectively. Thus, by moving handle 205 (Figs. 2 and 18) in one or the other direction, the split nut can be opened or closed. It is shown in open position in Figs. 7, 10, and 13 and in closed position in Fig. 14. The split nut must be closed when a thread is to be cut on the work and the feed screw is to drive the carriage. The split nut is open or disengaged when the work is to be turned, faced, or bored.

The drive for facing, turning or boring is actuated by a variable speed motor 225 which is mounted in any suitable manner on the apron 203 of the carriage (Figs. 1, 2, 5, 6, and 21). The armature shaft 226 of this motor is connected by a suitable coupling 227 with a shaft 228 that is suitably journalled in the apron 203. There is a worm 229 integral with this shaft. This worm meshes with a worm wheel 230 that is journalled on a stud 231 which is secured against rotation in the apron 203. Integral with the worm wheel is a bevel gear 233. This meshes with a bevel gear 234 which is rotatably mounted on a shaft 235 that is suitably journalled in the apron.

The shaft 228 also has a spur gear 236 secured to it. This spur gear meshes with a spur gear 238 which in turn meshes with a spur gear 239. The spur gear 238 is journalled on the shaft 235 and has a hub portion 240 integral with it that is formed with clutch teeth on its inside face. These teeth are adapted to be engaged with complementary face clutch teeth formed on one end of a sleeve member 242, which is splined or keyed to the shaft 235 and is axially slidable thereon. Sleeve member 242 has other face clutch teeth formed on its opposite end which are adapted to engage with face clutch teeth formed on the confronting face of the bevel gear 234. Thus, by shifting the sleeve member 242 into engagement either with the clutch teeth of the gear 238 or with clutch teeth of the gear 234, the shaft 235 may be driven selectively from the shaft 228 through spur gears 236 and 238 or through worm 229, worm wheel 230, bevel gear 233 and bevel gear 234. In this way, the shaft 235 may be driven selectively at two different speeds from the shaft 228. When the sleeve 242 is in neutral position, the shaft 235 does not rotate.

The sleeve 242 is adapted to be shifted axially by a lever 250 (Figs. 2, 17, and 18) which is secured to a vertical shaft 251 that is suitably journalled in the column 208. Fastened to the lower end of this shaft is an arm 253 which is connected by a pin 254 to a link member 255 which in turn is connected by a pin 256 with a rod 258.

The rod 258 (Figs. 2, 12 and 5) has an arm 260 secured to it by a split clamp. This arm terminates at its free end in a yoke which engages in the peripheral groove 262 of the sleeve 242. Thus, on movement of the lever 250 in one direction or the other, the sleeve 242 can be shifted in one direction or the other to connect operatively either the gear 238 or the gear 234 to the shaft 235.

There is a worm 265 (Figs. 5 and 21) integral with or keyed to the shaft 235. This worm meshes with a worm wheel 266 (Figs. 8, 12 and 21). The worm wheel is keyed to a sleeve 267 (Fig. 8) which is integral with a bevel gear 268. The sleeve 268 is journalled on a stud 269 which is suitably secured in the apron 203 against rotation. The bevel gear 268 meshes with a bevel gear 270 that is integral with a sleeve or hub 271. The sleeve or hub 271 is rotatably mounted on a shaft 272 which is suitably journalled in the apron 203. The spur gear 239 is also rotatably mounted on the shaft 272.

Keyed or splined to the shaft 272 and mounted to slide axially thereon is a sleeve 274 which has face clutch teeth formed on both its ends that are adapted to be engaged selectively with complementary face clutch teeth formed on the confronting ends of the hub 271 of bevel gear 270 and the hub 275 of spur gear 239, respectively. Thus, if the sleeve 242 (Figs. 5 and 21) is in neutral position, the shaft 272 may be driven from shaft 228 through spur gears 236, 238 and 239 by shifting sleeve 274 to the right (Figs. 8 and 21) to engage the face clutch teeth formed at the right-hand end of this sleeve with the face clutch teeth formed on the inner face of the hub of spur gear 239. On the other hand, by shifting the sleeve 242 to the left, and by shifting the sleeve 274 to the left to engage the clutch teeth formed on the left-hand end of this sleeve with the clutch teeth formed on the right-hand end of hub 271 of bevel gear 270, the shaft 272 may be driven from the shaft 228 through the worm 229, worm wheel 230, bevel gear 233, bevel gear 234, shaft 235, worm 265, worm wheel 266, bevel gear 268 and bevel gear 270 (Figs. 5, 8, 12 and 21).

Shift of sleeve 274 is effected from a lever 280 (Figs. 2 and 18) which has a split clamp connection with a shaft 282 that is suitably journalled in the upright 208. The shaft 281 has an arm 285 (Fig. 17) secured to it at its lower end by a split clamp connection. This arm is connected by a pin 284 with a link 286 which is pivotally connected by means of a pin 287 (Fig. 18) with a rod 288. The rod 288 is slidably mounted in the apron 203 and has a yoke member 289 (Figs. 8 and 12) secured to it by a split clamp connection. The free end of this yoke member is adapted to engage in the peripheral groove 290 of sleeve 274, so that when the lever 280 is moved in one direction or the other, the sleeve 274 is shifted axially on the shaft 272 to connect, selectively, either spur gear 239 or bevel gear 270 with that shaft.

There is a worm 295 keyed to or integral with the shaft 272. This worm meshes with a worm wheel 296 (Figs. 5, 11, and 21), that is keyed to shaft 297 which is suitably journalled in the apron 203. The shaft 297 has a sleeve 298 mounted on it for axial sliding movement. The sleeve has an external spur gear 300 and an internal gear 301 integral with it. The internal gear 301 is adapted, in one axial position of sleeve 298, to engage a wide-faced spur pinion 302 which is journalled on the shaft 297. The external gear 300 is adapted, in another position of sleeve 298, to mesh with a pinion 315.

The pinion 302 is a long-faced pinion, as stated, and is adapted to mesh at opposite sides with two spur gears 304 and 305 that are keyed to two parallel shafts 306 and 307, respectively. These shafts are suitably journalled in the apron 203. Integral with the shafts 306 and 307, respectively, are spur pinions 308 and 309, respectively, that mesh with a rack 220 (Figs. 1, 2, 4, 7, 17 and 21) at spaced points therealong. The rack 220 is fastened to the bed 30 of the machine by screws 310. When the sleeve 298 is shifted to the position where internal gear 301 meshes with spur pinion 302, then carriage 75 will be driven by the pinions 308 and 309 rotating on the fixed rack 220.

The spur gear 315, with which the spur gear 300 is adapted to mesh in the other position of sleeve 298, is secured to a shaft 316 (Figs. 2, 4 and 21) that is suitably journalled in carriage 75. The gear 315 meshes with a spur pinion 318 which is secured to the screw shaft 77 that effects the crosswise feed of the tool. This shaft threads into a nut 317 that is fastened by screws 319 to cross-slide 72 (Fig. 4). When the sleeve 298 is in position, therefore, where the spur gear 300 engages and meshes with spur gear 315, crosswise feed of the tool is effected while lengthwise movement of the carriage is stopped.

For shifting the sleeve 298, a lever 320 (Figs. 2 and 18) is provided. This lever is secured by a split clamp connection to a vertical shaft 321 which is suitably journalled in the upright 208. This shaft has a bevel gear 322 (Fig. 17) secured to its lower end which meshes with a bevel gear 323 that is keyed to a shaft 324. The shaft 324 has a yoke member 325 (Figs. 6 and 11) fastened to it whose ends carry rollers that engage in a peripheral groove 326 (Fig. 5) formed in the sleeve 298. By moving lever 320 in one direction or the other, then, internal gear 301 may be meshed with pinion 302 to produce longitudinal feed of carriage 75 for turning or boring, or external gear 300 may be meshed with gear 315 to produce crosswise feed of slide 72 for facing.

To avoid having the split nut in engagement with the lead screw 120 when the internal gear 301 is in mesh with pinion 302, an interlock is provided between shaft 206 (Fig. 18) which controls the shifting of rod 212 (Figs. 8 and 9), and shaft 321 (Fig. 18) which controls the shifting of sleeve 298 (Figs. 5 and 11). The shaft 206 has a notch 330 (Fig. 18) formed in its periphery and there is an arm 331 formed on upright 208 in which is slidably mounted a pin 332. This pin has both of its ends made conical. The shaft 321 has an arm 333 keyed or otherwise fastened to it just above bevel gear 322 (Fig. 2). This arm has a notch 334 formed centrally in its periphery.

In the position shown in Fig. 18, the lever 320 is locked against movement, one end of the pin 332 being engaged in the notch 334 of arm 333 and the opposite end of the pin riding on the periphery of the shaft 206. Thus the sleeve 298 (Figs. 5, 11 and 21) is in neutral position with gear 300 disengaged from gear 315 and gear 301 disengaged from pinion 302, while the lever 205 can be rotated to open or close the split nut about the lead screw 120.

In the position of lever 205 shown in Fig. 18, the split nut is engaged with the lead screw 120 and the drive to the carriage 75 is through the nut and lead screw as is required for thread-cutting. Plates 335, 336, 337 and 338 attached to column 208 below the levers 205, 259, 280, and 320, respectively, may be provided with designations, as shown in Fig. 18, to enable the operator properly to adjust the different levers for the different operations which he wishes performed on the machine.

When the lever 205 is rotated to the right from the position shown in Fig. 18, that is, to a position where the end 335 of pin 332 engages in notch 330, the split nut will be opened through operation of the mechanism shown in Figs. 8, 9, and 10, and the lever 320 can be moved either to the right or left from the neutral position shown in Fig. 18. In either direction of its movement, the pin 332 will ride on the periphery of plate 333 while it engages at its opposite end in the notch 330 of shaft 206. Thus, through the interlock, assurance is had that the split nut is open and the lead screw 120 cannot drive carriage 75 while lever 320 is in position to engage either the turning or crosswise feed mechanism.

When lever 320 is shifted to the left from the position shown in Fig. 18, the gear 300 will be moved into mesh with the gear 315 and cross-feed can be obtained, while when lever 320 is moved to the right from the position shown in Fig. 18, the gear 301 is moved into mesh with pinion 302 so that turning or boring can be accomplished. The speed at which turning, boring, or cross-feed is effected will depend on the positions of levers 259 and 280 as will be described further hereinafter. It is to be noted that it is only by bringing the two levers 205 and 320 to their neutral positions that one or the other can be moved. Thus, an absolute interlock is provided between the lead screw and the pinion and rack drive so that one or the other may be engaged but not both. Further than this, through this interlock the pinion drive to the feed rack or the cross-feed drive may be engaged, when the lead screw drive is disengaged, but not both simultaneously.

The rate at which cross-feed, turning, or boring is effected will depend, as stated above, upon the positions of levers 259 and 280 for these control, respectively, the axially movable sleeves 242 (Figs. 5 and 21) and 274 (Figs. 8 and 21). For the fine feed, the levers will be so positioned that the sleeve 242 connects bevel gear 234 with shaft 235 and the sleeve 274 connects bevel gear 270 with shaft 272. Then the drive is from shaft 223 through worm 229, worm wheel 230, bevel gears 233 and 234, worm 265, worm wheel 266, bevel gears 268 and 270, worm 295 and worm wheel 296 to shaft 297. For medium feed, the sleeve 242 is shifted to the right so that the drive will be from shaft 228 through spur gears 236 and 238, shaft 235, worm 265, worm wheel 266, bevel gears 268 and 270, worm 295 and worm wheel 296 to shaft 297. For coarse feed, sleeve 242 will be over to the right and so will sleeve 274 so that the drive will be from shaft 228 through spur gears 236, 238 and 239, shaft 272, worm 295 and worm wheel 296 to shaft 297.

The rods 258 and 288 (Fig. 12) which are actuated by these levers are interlocked so that shaft 272 can be driven at any one time at only one feed rate, namely, for fine, medium or coarse feed, respectively. The interlock between shift rods 258 and 288 is shown in Figs. 15 and 16. It comprises a pin 337 beveled on both ends. Shift rods 258 and 288 have notches 338 and 339, respectively in which opposite ends, respectively, of this pin are adapted to engage. In Fig. 15 both rods are shown in neutral position, and either one is free to be moved. Fig. 16 shows the rod 288 locked against movement, the lower end of pin 337 engaging in the notch 339 of rod 288 and the upper end of pin 337 riding on the periphery of rod 258. Rod 258 has been shifted to the right from the position shown in Fig. 15, as would be the case if sleeve 242 were shifted to connect spur gear 238 with shaft 235.

While the shift rods 258 and 288 control the rates of feed during turning, boring, or facing, the actual speed of these operations is controlled by the speed of motor 225. This is as already indicated a variable speed motor preferably of the electronic type and may have as wide a speed variation as from 15 to 1500 R. P. M. Its speed and direction can be controlled by suitable electric controls including start and stop and reverse buttons and a rheostat or potentiometer control button shown more or less diagrammatically at 365 in Fig. 17. These are mounted on an upright 366 where they are accessible to the operator as he stands on the carriage 75 in position to operate the several levers 205, 250, 320 and 280. Because of the size of the machine, steps 360 are provided so that the operator can readily climb up onto or down off of the saddle or operating platform 362. The steps 360 like uprights 366 and 208 are secured to carriage 75 to travel therewith.

Figure 19:
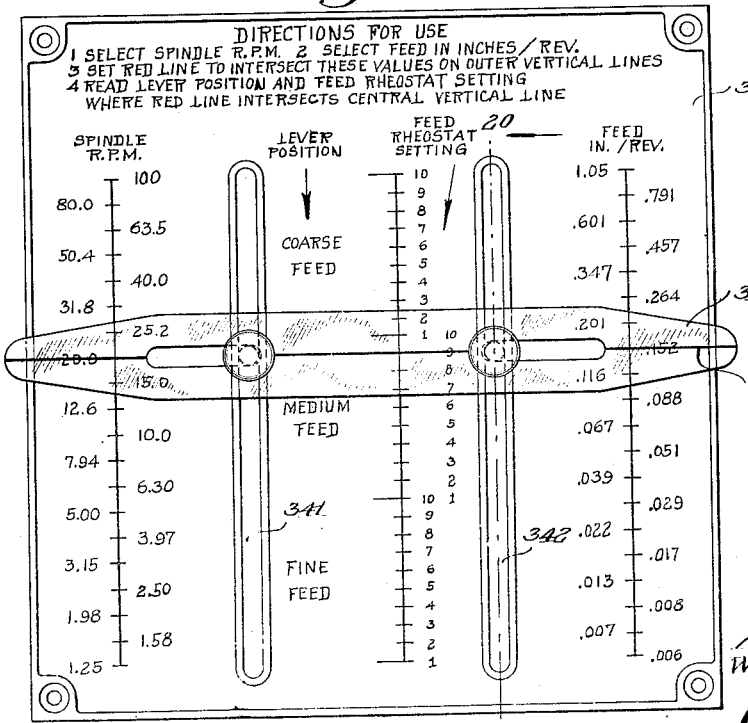
Fig. 19 is an elevational view of the combined chart and gauge which may be provided to enable the operator to quickly determine what motor speed and feed change gears he should use in a particular turning, boring, or facing operation.
Figure 20:
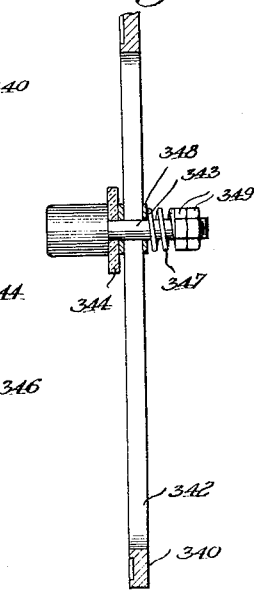
Fig. 20 is a section on the line 20—20 of Fig. 19.

For the assistance of the operator in determining what speed to use for the motor 225 and what lever settings to employ, in turning, facing or boring a particular job or a particular part of the work, a chart 340 may be provided on the machine like that shown in Figs. 19 and 20. On the left-hand side of this chart are graduations showing various spindle speeds obtainable on the machine. In the next column are simply the designations "Coarse Feed," "Medium Feed," and "Fine Feed." These denote the different feed rates obtainable by different settings of levers 250 and 280. The next column contains the feed rheostat settings for each position of the control levers. The right-hand column contains the feed in inches per revolution.

The chart may be placed on a heavy bronze or plastic plaque and has two longitudinal slots 341 and 342 formed therein. Mounted on the face of the chart and secured thereto by studs 343 is a transparent bar 344. This bar has a fine red line 346 scribed on it. By selecting the spindle speed and the desired feed in inches per revolution of the spindle, and then moving the bar 344 so that the line 346 reads against these graduations, the operator can read from the second and third columns of the chart what positions to use for levers 250 and 280 and what setting to employ on the rheostat which controls motor 225. A coil spring 347 on each of the studs 343, which is interposed between a washer 348 and the nuts 349, serves to hold the bar 345 in any adjusted position.

A tachometer 352 (Fig. 1) may be provided in order that the operator may readily read the spindle speeds. This may be driven in any suitable manner from the work spindle 33 as by means of the gear 350. This tachometer may be of any usual or suitable construction.

The chart 340 itself will be mounted preferably on uprights 355 (Figs. 4 and 17) so that it will be in position where it can readily be read by the operator as he adjusts the various shift levers.

An indicator 370 (Figs. 17 and 18) is provided to enable the operator to determine the exact relationship of the tool longitudinally of the work at any time. This indicator may be of any standard construction and is actuated by a pinion 371 which meshes with the lead screw 120 and which is secured to the carriage 75. The indicator 370 is mounted on this housing. As the carriage moves along the machine, the pinion 371 will roll on the lead screw 120 and actuate the indicator to denote how far the tool has moved axially along the work at any particular stage of the operation.

The tailstock 32 (Fig. 1) may be adjusted axially along the bed 30 to move center 36 into and out of operative relation with the work. This adjustment may be effected in conventional manner by actuation of the motor 380 (Figs. 1 and 21) which is mounted on the tailstock which drives through the worm 381 and worm wheel 382, the pinion 383 which meshes with a spur gear 384 that is secured to a shaft 385 which carries a pinion 386 that meshes with the rack 220. The tailstock may be also adjusted crosswise by a screw 392 which is journalled in the tailstock 32 and which threads into a nut carried by the supporting base 390. Bolts 393 serve to secure the headstock to the bed in any adjusted position.

The construction and operation of the machine have been described in such detail that they need only be summed up briefly now.

For thread-cutting the split nut 200—200' is engaged with the lead screw 120, and the work spindle 33 and lead screw 120 are driven from motor 80 in the proper timed relation to produce a thread of the desired pitch through the train of gearing shown in Fig. 21 and which includes suitable feed change gears. Drive of the carriage 75 through the pinions 308 and 309 and rack 220 and drive of cross-slide 72 through screw 77 are both prevented at this time through the interlock (Fig. 18) between lever 205, that controls the opening and closing of the split nut, and lever 320 that controls the position of sleeve 298.

When it is desired to face or turn or bore, lever 205 is shifted to the right from the position shown in Fig. 18, to open the split nut, and lever 320 is shifted either to the left or the right. Opening of the split nut disengages the carriage feed through feed screw 120, and shifting of lever 320 to right or left causes the carriage to be driven from motor 225. Thus during facing, turning, or boring, the work spindle 33 is still driven from motor 80, but the carriage 75 is driven from motor 225, while during thread-cutting, both work spindle 33 and carriage 75 are driven from motor 80. For facing, lever 320 is shifted to the left to cause gear 300 to mesh with gear 315. For boring or turning, lever 320 is shifted to the right to cause internal gear 301 to mesh with pinion 302. The rate of feed during facing, turning, or boring, is determined by the settings of levers 250 and 280 which control the positions of sleeves 242 and 274. The speed of operation during facing, turning, or boring is determined by the setting of the rheostat which controls motor 225. The tool may be positioned, of course, for facing operations at the correct angle to the work axis by adjustment of the table 70 or the cross-slide 72.

It will be seen, then, that a machine has been provided on which shift from thread-cutting to turning, boring or facing, or vice versa, can be effected instantaneously without stopping the machine; that turning, boring, and facing operations can be performed at the highest, production speed; that controls for the several operations are mounted so that the operator need not leave his operating position to effect shift from one operation to another or to vary the rate and speed of turning, boring, or facing operations; and that through provision of suitable interlocks, safe operation at all times is insured.

While the invention has been described in connection with a lathe, it is applicable to other types of machine tools, also. In fact, while the invention has been described in connection with a particular embodiment thereof, it is capable of further modification, and this application is intended to cover any adaptations, uses, or modifications of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. In a machine of the character described, a bed, a work spindle journalled in the bed, a carriage mounted on the bed for movement longitudinally of the work spindle, a slide mounted on the carriage for movement transversely of the carriage, a tool mounted on the slide, means comprising a motor and set of change gearing for rotating the work spindle, means comprising a split-nut, which is connected to the carriage, and a screw, that is rotatable therein, for moving the carriage, means for opening and closing the nut, a train of gearing, in which change gears are incorporated, for driving the screw in time with the work spindle, a shiftable member for selectively connecting or disconnecting said train of gearing with the work spindle, means operable to drive the carriage independently of the lead screw and nut during rotation of the work spindle, means operable to actuate the slide, means for actuating the two last-named means comprising a variable speed motor and a plurality of selectively operable sets of gears of different ratio, respectively, driven by said motor, shiftable means for selectively connecting the last-named actuating means with the means for actuating the carriage or the means for actuating the slide, shiftable means for selectively determining which set of gears is to be operable in the said last-named actuating means, and means for interlocking the first-named shiftable means with the means for opening and closing the nut.

2. In a machine of the character described, a bed, a work spindle journalled in the bed, a carriage mounted on the bed for movement longitudinally of the work spindle, a slide mounted on the carriage for movement transversely of the carriage, a tool mounted on the slide, means comprising a motor and set of change gears for rotating the work spindle, means comprising a split-nut, which is connected to the carriage, and a screw, that is rotatable therein, for moving the carriage, means for opening and closing the nut, a train of gearing, in which change gears are incorporated, for driving the screw in time with the work spindle, a shiftable member for selectively connecting or disconnecting said train of gearing with the work spindle, a shaft, a plurality of sets of gears for selectively driving said shaft, a variable speed motor, means shiftable to connect said sets of gears selectively with said motor, means shiftable to connect said shaft selectively with said carriage or with said slide to actuate carriage or slide, and means preventing connection of the shaft with the carriage or slide while the split-nut is closed.

3. In a machine of the character described, a bed, a work spindle journalled in the bed, a carriage mounted on the bed for movement longitudinally of the work spindle, a slide mounted on the carriage for movement transversely of the carriage, a tool mounted on the slide, means for rotating the work spindle, means comprising a split-nut, which is connected to the carriage, and a screw, that is rotatable therein, for moving the carriage, a lever for opening and closing said nut, a train of gearing including change gears for driving the screw from the work spindle in time therewith, a shiftable member for selectively connecting or disconnecting said train of gearing to the work spindle, a shaft, a plurality of sets of gears for selectively driving said shaft, a variable speed motor, a plurality of shiftable clutches for selectively connecting the sets of gears operatively with said motor and shaft, levers for actuating said clutches, means shiftable to connect said shaft selectively with the carriage or with the slide to actuate carriage or slide, a lever for actuating said shiftable means, and means for preventing connection of the shaft with the carriage or slide while the split-nut is closed, all of said levers being located adjacent one another to be accessible to the operator in one position.

4. In a machine of the character described, a bed, a work spindle journaled in the bed, a carriage slidable on the bed axially of the work spindle, a motor and selectively connectable change gears for driving the work spindle at different speeds, a screw and a split nut for actuating the carriage, a train of gearing including change gears for driving said screw at different speeds, shiftable means for connecting or disconnecting said train of gearing to the work spindle, and separate means for actuating said carriage during rotation of the work spindle when the screw and nut are disconnected from the work spindle comprising a rack, which is secured to the bed, and a pinion meshing with said rack and journaled in said carriage, a variable speed motor mounted on said carriage, a second train of gearing including a plurality of selectively connectable change gears, for unidirectionally driving said pinion at selectively different speeds from said variable speed motor, and means for selectively connecting said change gears in said second train of gearing, and means preventing rotation of the pinion while the nut is engaged with the screw and vice versa.

5. In a machine of the character described, a bed, a work spindle journaled in the bed, a carriage slidable on the bed axially of the work spindle, a nut, which is secured to the carriage, and a screw threading into said nut for actuating the carriage, a slide mounted on the carriage for movement transversely of the work spindle, a tool mounted on said slide, a motor and a train of gearing including change gears for rotating the work spindle, a train of gearing including change gears for rotating said screw, a shiftable member for selectively connecting or disconnecting the second-named train of gearing to the work spindle, a rack secured to the carriage, a pinion meshing therewith, a nut secured to the slide, a screw threading therein, a variable speed motor, a train of gearing including change gears driven by said motor, means for selectively connecting said last-named train of gearing to the pinion or to the last-named screw, and means for preventing connection of the last-named train of gearing to either the pinion or the last-named screw when the second-named train of gearing is connected to the work spindle.

6. In a machine of the character described, a bed, a work spindle journaled in the bed, a tool-supporting carriage mounted on the bed for movement longitudinally of the work spindle, means comprising a motor and a set of change gears for rotating the work spindle, means comprising a split-nut, which is connected to the carriage, a screw, that is rotatable in said split-nut, and a train of gearing, in which change gears are incorporated, for driving the screw in time with the rotation of the work spindle, means for opening and closing said split-nut, a shiftable clutch for connecting or disconnecting said train of gearing with said work spindle, separate means for driving said carriage independently of said lead screw and split-nut during rotation of the work spindle comprising a rack which is secured to said bed, a pinion meshing with said rack and journaled in said carriage, a variable speed motor, a plurality of different sets of gears selectively couplable to said variable speed motor and said pinion to transmit unidirectional power at selectively different speeds from said variable speed motor to said pinion, said different set of gears being, respectively, of different ratio, shiftable means for selectively coupling said sets of change gears with said variable speed motor and said pinion, and interlock means preventing transmission of power between said variable speed motor and said pinion when said split-nut is engaged with said feed screw, and said interlock means including means preventing closing of said split-nut when said pinion is coupled to said variable speed motor.

7. In a machine of the character described, a bed, a work spindle journaled in the bed, a carriage mounted on the bed for movement longitudinally of the work spindle, a slide mounted on the carriage for movement transversely of the carriage, a tool mounted on the slide, means for rotating the work spindle, means comprising a split-nut, which is connected to the carriage, and a screw, that is rotatable in the nut, for moving said carriage, a train of gearing for driving said screw from the work spindle in time with the rotation of the work spindle, a shiftable member for selectively connecting or disconnecting said train of gearing to or from said work spindle, separate means for selectively moving said carriage or said slide while the work spindle is being driven from said spindle-rotating means and while said train of gearing is disconnected from the work spindle comprising a variable speed motor which is mounted on the carriage, and a second train of gearing, including a plurality of selectively-operable gear sets, which is adapted to be driven by said variable speed motor, means for selectively connecting any of said gear sets of said second train of gearing to said carriage or to said slide for selective speeds in a single direction, means for opening and closing said split-nut, and means for interlocking the two last named means so that the nut cannot be closed while said second train of gearing is operatively connected to either the carriage or the slide, and vice-versa, preventing transmission of power from said variable speed motor to either the carriage or the slide when the nut is closed.

8. In a machine of the character described, a bed, a work spindle journaled in the bed, a tool-supporting carriage mounted on the bed for movement longitudinally of the work spindle, means comprising a motor and a set of change gears for rotating the work spindle, means comprising a split-nut, which is connected to the carriage, a screw, that is rotatable in said split-nut, and a train of gearing, in which change gears are incorporated, for driving the screw in time with the rotation of the work spindle, a shiftable clutch for connecting or disconnecting said train of gearing with said work spindle, separate means for driving said carriage independently of said screw and split-nut during rotation of the work spindle comprising a rack which is secured to said bed, a pinion meshing with said rack and journaled in said carriage, a variable speed motor mounted on said carriage, a shaft, a plurality of different sets of gears selectively couplable to said variable speed motor and said shaft to transmit power from said variable speed motor to said shaft, said different sets of gears being, respectively, of different ratio, a plurality of shiftable clutches for selectively coupling the different sets of gears with said variable speed motor and said shaft, levers for actuating said clutches, means shiftable to connect and disconnect said shaft and said pinion, a lever for actuating said last-named shiftable means, means preventing connection of said shaft with said pinion while said split-nut is closed and vice-versa, and a lever controlling opening and closing of said split nut, all of said levers being located adjacent one another to be accessible to the operator in one position.

ALFRED TROSCH.
WORTHY J. F. FORWARD.

REFERENCES CITED

The following references are of record in the file of this patent:

UNITED STATES PATENTS

| Number | Name | Date |
| --- | --- | --- |
| 1,477,186 | Randolph | Dec. 11, 1923 |
| 1,571,323 | Cole | Feb. 2, 1926 |
| 1,944,231 | Groene | Jan. 23, 1934 |
| 2,050,746 | Bickel | Aug. 11, 1936 |
| 2,161,545 | Groene | June 6, 1939 |
| 2,325,733 | Bickel | Aug. 3, 1943 |